United States Patent
Lang

(10) Patent No.: US 8,635,662 B2
(45) Date of Patent: Jan. 21, 2014

(54) DYNAMIC TRUST MODEL FOR AUTHENTICATING A USER

(75) Inventor: David E. Lang, Simi Valley, CA (US)

(73) Assignee: Intuit Inc., Mountain View, CA (US)

(*) Notice: Subject to any disclaimer, the term of this patent is extended or adjusted under 35 U.S.C. 154(b) by 849 days.

(21) Appl. No.: 12/023,848

(22) Filed: Jan. 31, 2008

(65) Prior Publication Data

US 2009/0199264 A1  Aug. 6, 2009

(51) Int. Cl.
*G06F 17/00* (2006.01)

(52) U.S. Cl.
USPC ......... 726/1; 726/3; 726/6; 713/168; 709/229

(58) Field of Classification Search
USPC .............................................................. 726/1
See application file for complete search history.

(56) References Cited

U.S. PATENT DOCUMENTS

| | | | |
|---|---|---|---|
| 2006/0212931 A1* | 9/2006 | Shull et al. ...................... | 726/10 |
| 2006/0230461 A1* | 10/2006 | Hauser ............................ | 726/27 |
| 2006/0277591 A1* | 12/2006 | Arnold et al. .................... | 726/1 |
| 2008/0034209 A1* | 2/2008 | Dickinson et al. ............. | 713/168 |
| 2008/0155644 A1* | 6/2008 | Baranov et al. .................. | 726/1 |
| 2009/0024589 A1* | 1/2009 | Sood et al. ........................ | 707/3 |
| 2009/0064293 A1* | 3/2009 | Li et al. ............................. | 726/6 |
| 2009/0100504 A1* | 4/2009 | Conner et al. .................... | 726/3 |
| 2009/0113062 A1* | 4/2009 | Woodman ..................... | 709/229 |

* cited by examiner

*Primary Examiner* — Linglan Edwards
*Assistant Examiner* — Gary Gracia
(74) *Attorney, Agent, or Firm* — Park, Vaughan, Fleming & Dowler LLP; Steven E. Stupp

(57) ABSTRACT

A system that that dynamically authenticates one or more users is described. During operation, the computer system determines a trust level for a user, where the trust level is a function of elapsed time since the user previously provided authentication information. Next, the computer system calculates a transaction risk level based on a type of user transaction performed by the user. Then, the computer system requests additional authentication information from the user based on the trust level and the transaction risk level.

19 Claims, 6 Drawing Sheets

DYNAMIC TRUST MODEL FOR AUTHENTICATING A USER

BACKGROUND

The present invention relates to techniques for dynamically determining user authentication and/or authorization.

Authentication and authorization are widely used procedures that, respectively, enable a user to access an application or system by confirming the user's identity and to verify the authority of the user to perform certain operations, actions or tasks (henceforth referred to as transactions). For example, the user may provide information, such as a username, a password, or a pin number during these procedures to confirm the user's identity (authentication) and/or the user's right to transfer funds from a bank account (authorization). Note that authentication is a broader term than authorization, and authentication typically precedes or is coincident with authorization. In the discussion that follows authentication has a broad definition and, in some embodiments, includes authorization.

As security threats continue to grow, many applications and systems are significantly increasing such protection requirements. This is especially true in networked environments, such as the Internet or World Wide Web (WWW). As a consequence, many applications and systems utilize multiple authentication factors to perform authentication (also referred to as multi-factor authentication). Such multi-factor authentication may include something the user knows (for example, a password), something the user has (for example, a physical token), and/or something the user is (for example, a biometric feature).

Unfortunately, authentication for a given transaction is typically a Boolean or binary function, e.g., the user's identity is confirmed or it is not and/or the user is authorized to perform the given transaction or is not. This is a challenge when multiple authentication factors are used because these factors are often treated as equivalent in determining when to convert from one state (the user's identity is not confirmed and/or the user is not authorized to perform the given transaction) to another state (the user's identity is confirmed and/or the user is authorized to perform the given transaction).

Moreover, while there may be different thresholds for authentication that are associated with different transactions (some high-risk transactions may have a higher threshold), once confirmed the user's authentication remains valid (e.g., in the other state) until a pre-determined time interval has expired (such as a timeout) or until the user terminates a session. However, this makes it difficult to respond to dynamically changes in user behavior and/or in an overall security risk.

SUMMARY

One embodiment of the present invention provides a computer system that dynamically authenticates one or more users. During operation, the computer system determines a trust level for a user, where the trust level is a function of elapsed time since the user previously provided authentication information. Next, the computer system calculates a transaction risk level based on a type of user transaction performed by the user. Then, the computer system requests additional authentication information from the user based on the trust level and the transaction risk level.

In some embodiments, the additional authentication information is requested when the transaction risk level exceeds the trust level.

In some embodiments, the trust level decreases as a function of elapsed time. Moreover, a rate of decrease of the trust level may be based on one or more characteristics of the authentication information the user previously provided. For example, a magnitude of the rate of decrease may be greater than a pre-determined value if the authentication information includes a user identifier, such as a password and/or a username. Alternatively, the magnitude of the rate of decrease may be smaller than the pre-determined value if the authentication information includes a physical token.

Note that the rate of decrease of the trust level may be based on a user location. For example, the user location may be determined based on a network address, such as an Internet Protocol address. Moreover, the magnitude of the rate of decrease may be increased if the user location is different than during a previous user transaction.

In some embodiments, the rate of decrease of the trust level is based on a security threat that affects multiple users. For example, the security threat may include an attempted 'phishing' attack on account information associated with at least one of the multiple users.

In some embodiments, the trust level is increased when the user provides the additional authentication information. For example, the increase in the trust level may be less than another pre-determined value if the authentication information includes a user identifier, such as a password and/or a username. Alternatively, the increase in the trust level may be greater than the other pre-determined value if the authentication information includes a physical token.

In some embodiments, the computer system terminates a user session if the trust level is less than a pre-determined or minimum threshold.

Note that the transaction risk level may be based on a user-account history.

Another embodiment provides a method including at least some of the above-described operations.

Another embodiment provides a computer program product for use in conjunction with the computer system.

Figure 1:
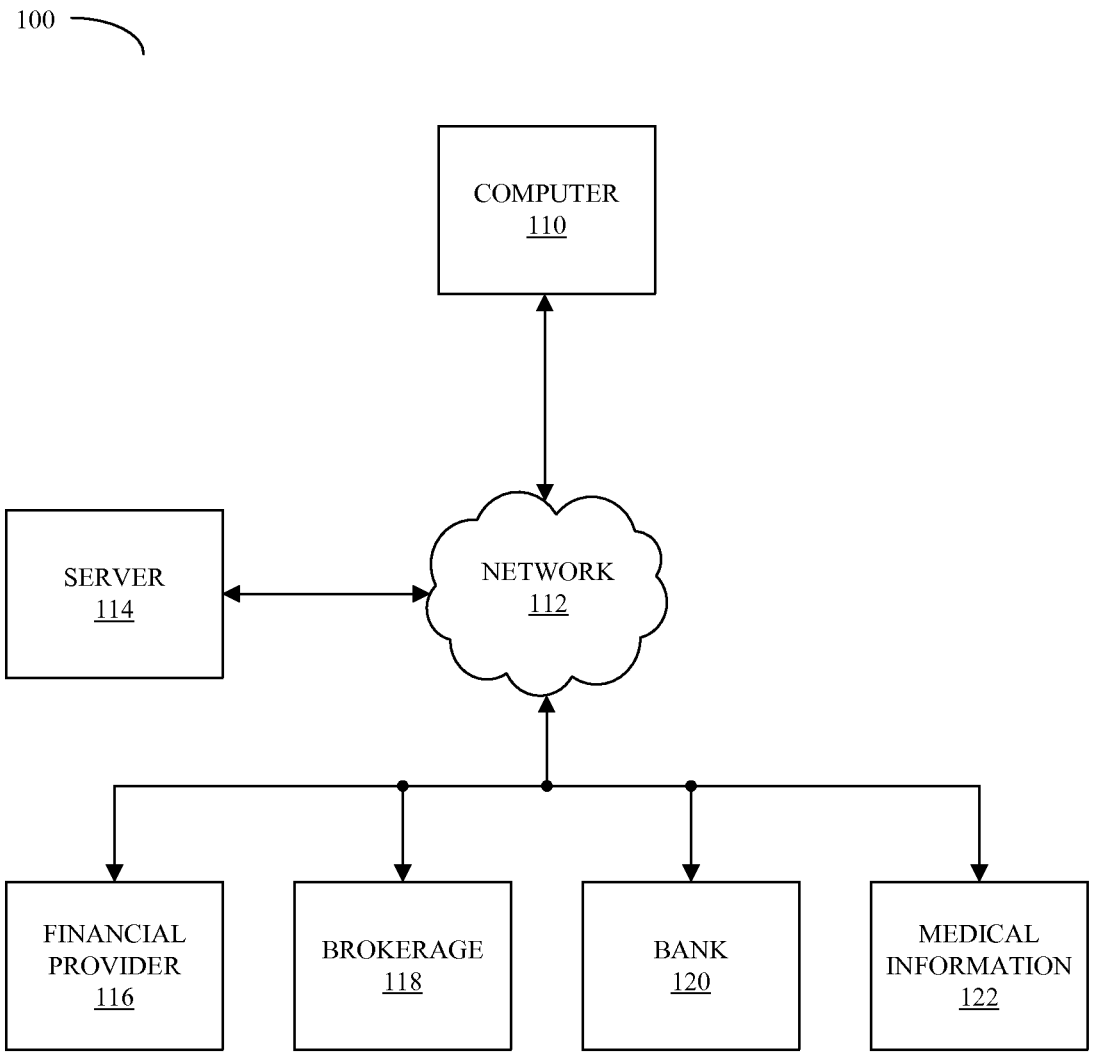
FIG. 1 is a block diagram illustrating a computer system that includes computers and servers that are networked together in accordance with an embodiment of the present invention.

Table 1 provides pseudo-code in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (e.g., software) for use with the computer system are described. These devices and processes may be used to dynamically authenticate a user who is attempting to conduct one or more transactions while communicating with the computer system (henceforth referred to as a session) via a network, such as the Internet or an Intranet. In particular, during the session the computer system may determine a trust level for the user, where the trust level is a function of elapsed time since the user previously provided authentication information and/or previously performed a transaction. For example, the trust level may decrease as a function of time, and a magnitude of a rate of decrease may be based on characteristics of the authentication information the user previously provided (such as a username, a password, or a physical token). Additionally, the rate of decrease of the trust level may be based on a user location, such as a kiosk versus the user's home computer, or a fixed location versus a mobile device. Note that the rate of decrease of the trust level may be based on external factors, such as a security threat to the computer system or the network that affects multiple users.

Moreover, the computer system may calculate a transaction risk level based on a type of user transaction performed by the user (where different types of transactions may have different risk levels) and/or a user-account history. Then, if transaction risk level exceeds the trust level, the computer system may request additional authentication information. Note that the trust level may be increased when the user provides the additional authentication information. Additionally, note that the increase in the trust level may be based on characteristics of the additional authentication information.

By dynamically authenticating the user, this technique allows the computer system to adapt based on a variety of factors, such as the user activity and/or the overall security threat. Moreover, this technique allows multiple authentication factors having different weighting or importance to be used, thereby allowing the authentication threshold to be tailored to a particular user, their transactions and/or the associated user environment. Additionally, by decreasing the trust level over time, this technique enforces a dynamic timeout criterion.

Note that this authentication technique may be implemented as a stand-alone software application, or as a program module or subroutine in another application, such as the financial software. Furthermore, the software may be configured to execute on a client computer, such as: a personal computer, a laptop computer, cell phone, PDA, or other device capable of manipulating computer readable data, or between two or more computing systems over a network (such as the Internet, World Wide Web or WWW, Intranet, LAN, WAN, MAN, or combination of networks, or other technology enabling communication between computing systems). Therefore, information associated with the trust level and the transaction risk level for one or more users may be stored locally (for example, on a local computer) and/or remotely (for example, on a computer or server that is accessed via a network).

We now describe embodiments of a computer system, a method, and software for authenticating a user. FIG. 1 presents a block diagram illustrating a computer system 100 that includes a number of computers and servers that are networked together. One or more users may provide one or more authentication factors (and, more generally, authentication information) to a program, such as a financial program, that executes on computer 110. Using this financial program, a given user may conduct or perform one or more transactions via network 112. For example, the user may conduct a financial transaction with financial provider 116, brokerage 118 and/or bank 120. Alternatively, the user may access or update medical information 122 (such as that stored and/or maintained by a medical provider or insurer).

As noted above, this financial program may be a stand-alone application or may be embedded in another application. In one embodiment, the financial program includes software such as: Quicken™ and/or TurboTax™ (from Intuit, Inc., of Mountain View, Calif.), Microsoft Money™ (from Microsoft Corporation, of Redmont, Wash.), SplashMoney™ (from SplashData, Inc., Los Gatos, Calif.), Mvelopes™ (from In2M, Inc., Draper, Utah), and/or open-source applications such as Gnucash™, PLCash™, and/or Budget™ (from Snowmint Creative Solutions, LLC).

In some embodiments, the financial program may be resident on the computer 110. However, other embodiments may utilize a financial tool that is embedded in a web page (once again, either as a stand-alone application or as a portion of another application). This web page may be provided by server 114 via network 112. In an illustrative embodiment, the financial tool is a software package written in: JavaScript™ (e.g., the financial tool includes programs or procedures containing JavaScript instructions), ECMAScript (the specification for which is published by the European Computer Manufacturers Association International), VBScript™ (a trademark of Microsoft, Inc.) or any other client-side scripting language. In other words, the embedded financial tool may include programs or procedures containing: JavaScript, ECMAScript instructions, VBScript instructions, or instructions in another programming language suitable for rendering by a browser or another client application on the computer 110.

Note that the authentication information provided by the user may include static information and/or dynamic information. For example, static information for the user may include: a social security number, one or more usernames, one or more passwords, one or more pins, one or more telephone numbers, one or more addresses, and/or additional personal information. Such static information may be stored locally (e.g., on the computer 110) and/or remotely (for example, on the server 114). In addition, the dynamic information may include one or more Rivest-Shamir-Adleman (RSA) tokens that expire after a pre-determined time interval. Such dynamic information may also be stored locally and/or remotely.

During a session in which the user performs one or more transactions (for example, different types of transactions), the financial program may request additional authentication information from the user to dynamically authenticate the user via a dynamic trust model. In particular, a computer program that executes on the server 114 and/or the computer 110 may determine a trust level for the user. This trust level may be a function of an elapsed time since the user previously provided authentication information and/or since a user previously performed a transaction. For example, the trust level may decrease as a function of elapsed time. In this way, a timeout of the user's authentication may be built into the dynamic trust level (and the timeout time interval may be different for different users and/or at different times). Moreover, the longer it has been since the user authenticated, the less confident the computer system 100 is that a new transaction is associated with the user (as opposed to the user walking away from their desk and a co-worker taking the opportunity to use their computer).

In some embodiments, a rate of decrease of the trust level (which is sometimes referred to as a trust-level slope) is based on one or more characteristics of the authentication information the user previously provided. For example, a magnitude of the rate of decrease may be greater than a pre-determined value if the authentication information includes a user identifier, such as a password and/or a username. Alternatively, the magnitude of the rate of decrease may be smaller than the pre-determined value if the authentication information includes a physical token.

Note that the rate of decrease of the trust level may be based on a user location. In some embodiments, the user location is a physical location, such as that determined using a positioning system (for example, using a Global Positioning System). However, in some embodiments the user location is determined based on a network address, such as an Internet Protocol address. Moreover, the magnitude of the rate of decrease may be increased if the user location is different than during a previous user transaction. For example, the magnitude of the rate of decrease may be larger if the computer 110 is a mobile device (as opposed to a device at a fixed location). Additionally, the magnitude of the rate of decrease may be larger if the computer 110 is a kiosk or a public computer (as opposed to the user's home computer). In an exemplary embodiment, the magnitude of the rate of decrease used when the user is at a mobile location is three times smaller than that used when the user is at a kiosk.

In some embodiments, the rate of decrease of the trust level is based on information provided by the user. For example, during login (i.e., when the user provides initial authentication information at the start of a session), the user may be asked how much they trust computer 110. In an exemplary embodiment, the answer to this question includes: a) nobody else has access to this computer; b) this is a shared family computer; c) this is a computer in an office; and d) this is an airport kiosk. Note that the magnitude of the rate of decrease of the trust level may range from larger (answer d) to smaller (answer a).

Moreover, the dynamic trust model allows the trust level of multiple users to be adjusted based on a security threat to the computer system 100 (which can affect the multiple users). In some embodiments, in the event of such a security threat, computer 110 and/or server 114 increases the rate of decrease of the trust levels of multiple users. For example, the security threat may include an attempted 'phishing' attack on account information associated with at least one of the multiple users, during which a malicious user attempts to trick a victim into accepting a false identity, which enables the malicious user to access or obtain sensitive information (such as a credit-card number, a bank-account number, a social-security number, or a username and password). In an exemplary embodiment, the malicious user sends an email falsely claiming to be an established, legitimate enterprise in an attempt to scam the victim into providing sensitive information that can be used for identity theft. In some cases, the email may include a link to a fake website (which is a replica of a trusted website) where the sensitive information is requested.

Additionally, the computer program that executes on the server 114 and/or the computer 110 may calculate a transaction risk level based on a type of user transaction performed by the user. Therefore, different types of transactions may have different associated risk values, and thus, may make different contributions to the transaction risk level and/or may define different transaction risk levels. This allows higher authentication security to be used for higher-risk transactions. Moreover, the transaction risk level may be based on: a user-account history (such as recent transactions conducted by the user and/or based on user behavior) and/or a security threat to the computer system 100 (such as a 'phishing' attack) that affects multiple users. In an exemplary embodiment, the risk value for a wire transfer may be 90, the risk value based on accessing a web page that contains user-account history may be 50, and the risk value based on accessing a web page with account-status information may be 10.

If the transaction risk level exceeds the trust level, the computer program that executes on the server 114 and/or the computer 110 may request additional authentication information from the user. Note that the trust level is increased when the user provides the additional authentication information. For example, the increase in the trust level may be less than another pre-determined value if the authentication information includes a user identifier, such as a password and/or a username. Alternatively, the increase in the trust level may be greater than the other pre-determined value if the authentication information includes a physical token. In an exemplary embodiment, the trust level increase for a physical token is 80 or 100, while the trust level increase for a username or a password is 30.

In some embodiments, the computer system terminates a user session if the trust level is less than a pre-determined or minimum threshold. For example, if the trust level is less than 0, the session may be terminated and the user may need to authenticate from scratch (as opposed to providing the additional authentication information during an existing session).

Note that the dynamic trust model may be combined with other authentication protocols or techniques. For example, the risk-value contributions to the transaction risk level, which are associated with different types of transactions, may be increased based on an analysis of the user's activity (such as the user-account history).

Additionally, this dynamic trust model allows different types of authentication to be used, and these different types of authentication may be treated differently (e.g., they may not all be accorded the same weighting or importance during authentication). This flexibility allows the computer system 100 to use a wide variety of authentication information, which individually may not be sufficient for high-risk actions, without forcing the user to provide high-security authentication information to perform low-risk transactions. Consequently, in some embodiments the authentication information includes a wide variety of factors, including: a username or identifier, a password, a physical token, an answer (such as a code) provided in response to an SMS message sent to the user's cellular telephone, an answer (such as a code) provided in response to an voice message or phone call sent to the user's cellular telephone, answers to personal questions, a one-time or one-use code, and/or voiceprint matching. Note that these different authentication factors may be assigned values that contribute to the trust level of the user.

Because the authentication information, as well as the information associated with the dynamic trust model may be sensitive in nature, in some embodiments such information may be encrypted. Additionally, such information may be encrypted when it is communicated over the network 112.

Note that in some embodiments the computer system 100 includes fewer or additional components. Moreover, two or more components are combined into a single component, and/or a position of one or more components may be changed.

Figure 2:
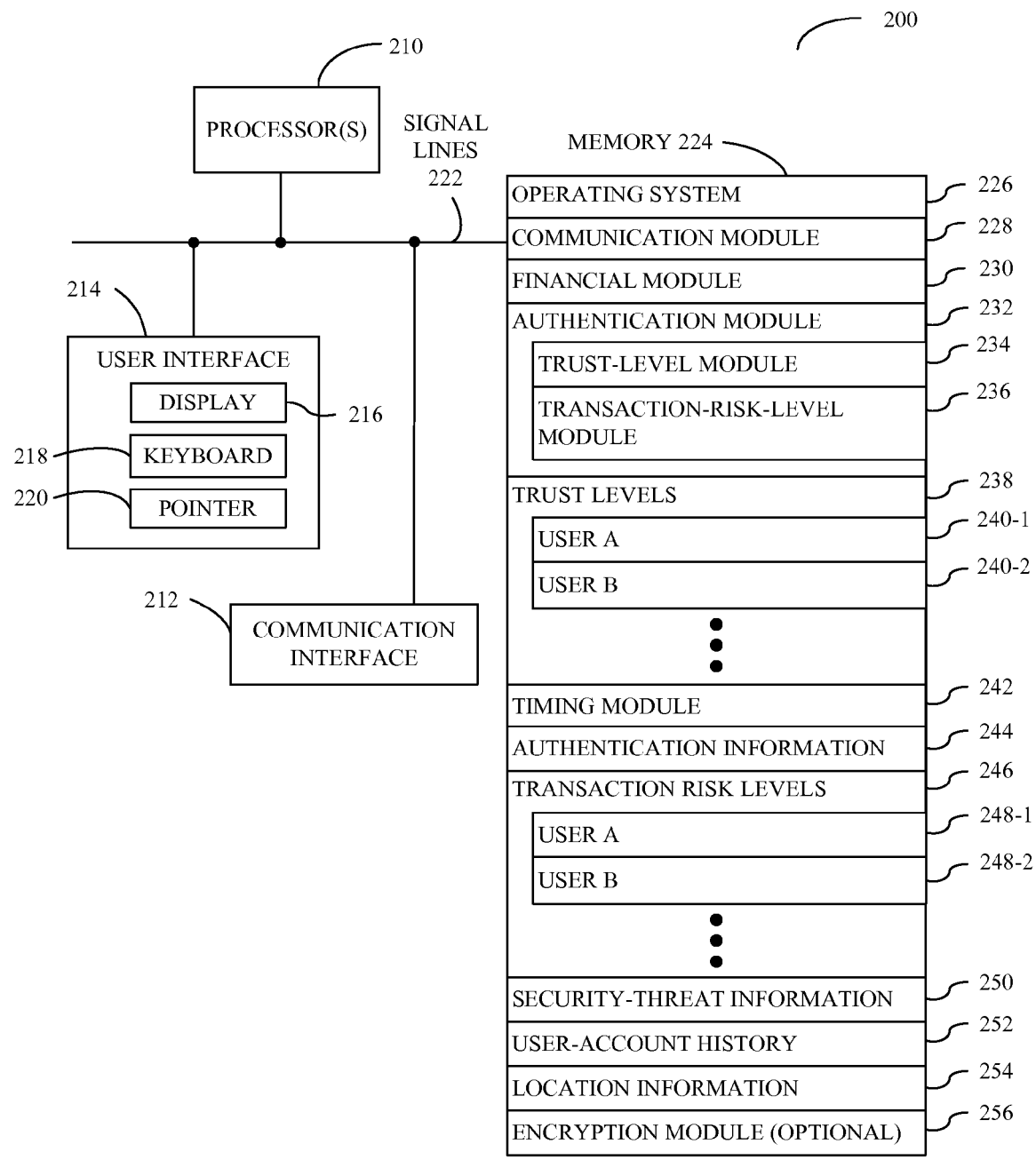
FIG. 2 is a block diagram illustrating a computer system in accordance with an embodiment of the present invention.

FIG. 2 presents a block diagram illustrating a computer system 200. The computer system 200 includes one or more processors 210, a communication interface 212, a user interface 214, and one or more signal lines 222 coupling these components together. Note that the one or more processing units 210 may support parallel processing and/or multi-threaded operation, the communication interface 212 may have a persistent communication connection, and the one or more signal lines 222 may constitute a communication bus. Moreover, the user interface 214 may include: a display 216, a keyboard 218, and/or a pointer 220, such as a mouse.

Memory 224 in the computer system 200 may include volatile memory and/or non-volatile memory. More specifically, memory 224 may include: ROM, RAM, EPROM, EEPROM, Flash, one or more smart cards, one or more magnetic disc storage devices, and/or one or more optical storage devices. Memory 224 may store an operating system 226 that includes procedures (or a set of instructions) for handling various basic system services for performing hardware dependent tasks. While not explicitly indicated in the computer system 200, in some embodiments the operating system 226 includes a web browser. Memory 224 may also store procedures (or a set of instructions) in a communication module 228. These communication procedures may be used for communicating with one or more computers and/or servers, including computers and/or servers that are remotely located with respect to the computer system 200.

Memory 224 may also include multiple program modules (or a set of instructions), including: financial module 230 (or a set of instructions), authentication module 232 (or a set of instructions), timing module 242 (or a set of instructions), and/or optional encryption module 256 (or a set of instructions). Moreover, authentication module 232 may include trust-level module 234 (or a set of instructions) and transaction-risk-level module 236 (or a set of instructions).

When a given user provides initial authentication information, for example to financial module 230, this authentication information may be stored in authentication information 244. Then, authentication module 232 may dynamically determine a trust level using trust-level module 234. This trust level may be stored in trust levels 238 (such as the trust level for user A 240-1 or the trust level for user B 240-2). Note that the current trust level may be based on: an elapsed time since authentication information (such as the initial authentication information and/or additional authentication information) was provided (which can be determined by timing module 242); an elapsed time since the user performed a transaction; one or more characteristics of the authentication information 244 (such as the initial authentication information and/or additional authentication information); a user-account history 252 (such as transactions that the user has previously performed); and/or location information 254 (such as whether or not the user is at a fixed or a mobile location, or whether the user location is the typical location where the user conducts transactions). For example, the location information 254 may include an Internet Protocol address of the user's home computer.

Moreover, transaction-risk-level module 236 may dynamically calculate a transaction risk level associated with: the user, the user's activities, the user-account history 252; and/or security-threat information 250 (such as the occurrence of a 'phishing' attack on the computer system 200). Note that the transaction risk level may be stored in transaction risk levels 246 (such as the transaction risk level for user A 248-1 or the transaction risk level for user B 248-2).

In some embodiments, communication between the user and the computer system 200 and/or information stored in the computer system 200 is encrypted using optional encryption module 256.

Instructions in the various modules in the memory 224 may be implemented in: a high-level procedural language, an object-oriented programming language, and/or in an assembly or machine language. Note that the programming language may be compiled or interpreted, e.g., configurable or configured to be executed by the one or more processing units 210.

Although the computer system 200 is illustrated as having a number of discrete items, FIG. 2 is intended to be a functional description of the various features that may be present in the computer system 200 rather than as a structural schematic of the embodiments described herein. In practice, and as recognized by those of ordinary skill in the art, the functions of the computer system 200 may be distributed over a large number of servers or computers, with various groups of the servers or computers performing particular subsets of the functions. In some embodiments, some or all of the functionality of the computer system 200 may be implemented in one or more ASICs and/or one or more digital signal processors DSPs.

Computer system 200 may include fewer components or additional components. Moreover, two or more components may be combined into a single component, and/or a position of one or more components may be changed. In some embodiments, the functionality of the computer system 200 may be implemented more in hardware and less in software, or less in hardware and more in software, as is known in the art.

Figure 3:
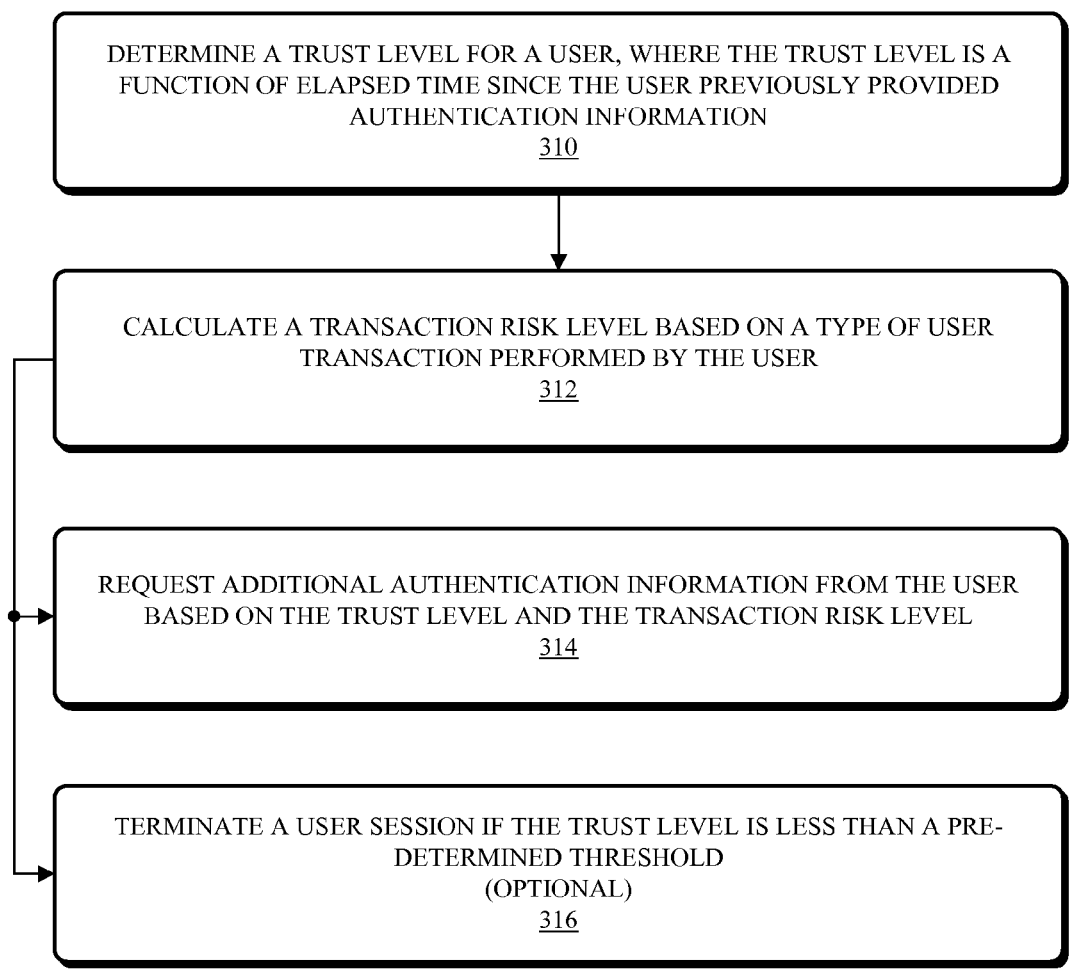
FIG. 3 is a flow chart illustrating a process for authenticating a user in accordance with an embodiment of the present invention.

We now discuss methods for authenticating a user. FIG. 3 presents a flow chart illustrating a process 300 for authenticating a user, which may be performed by a computer system. During operation, the computer system determines a trust level for a user (310), where the trust level is a function of elapsed time since the user previously provided authentication information. Next, the computer system calculates a transaction risk level based on a type of user transaction performed by the user (312). Then, the computer system requests additional authentication information from the user based on the trust level and the transaction risk level (314). In some embodiments, the computer system optionally terminates a user session if the trust level is less than a pre-determined threshold (316).

Figure 4:
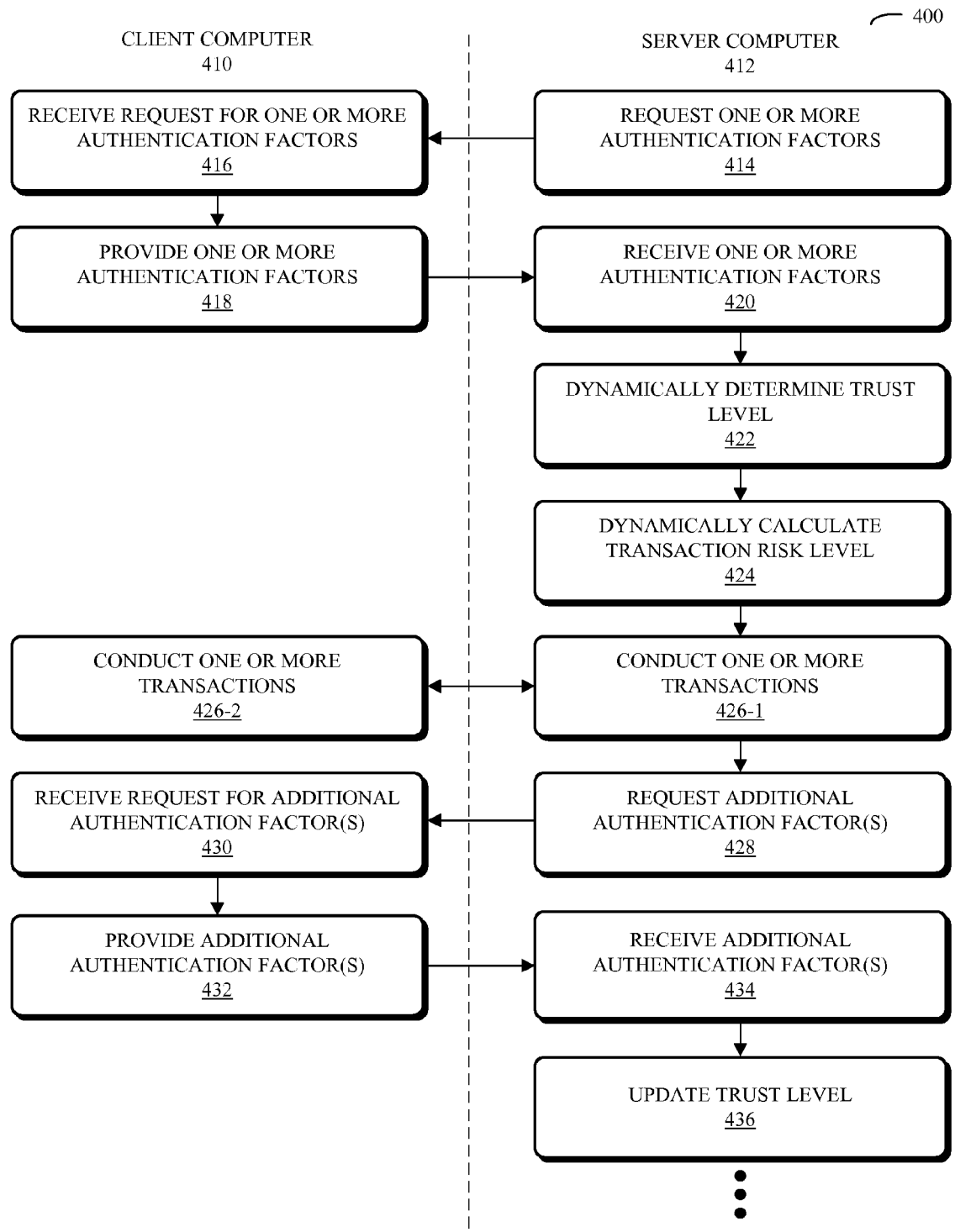
FIG. 4 is a flow chart illustrating a process for authenticating a user in accordance with an embodiment of the present invention.

FIG. 4 presents a flow chart illustrating a process 400, such as that utilized in an on-line environment, for authenticating a user. During process 400, an application executing, at least in part, on a server computer 412 requests one or more authentication factors (414), such as the initial authentication factor, from a user of the application on client computer 410. Then, the user receives the request for the one or more authentication factors (416) and provides the one or more authentication factors (418). Next, the system receives the one or more authentication factors (420).

Using factors, such as one or more characteristics of the one or more authentication factors, an elapsed time since the system received the one or more authentication factors (420), an elapsed time since the user performed a transaction, a current rate of change of the trust-level, etc., the system dynamically determines a trust level (422) for the user. Moreover, the system dynamically calculates a transaction risk level (424) based, for example, on a type of transaction performed by the user.

This user may conduct one or more transactions (426). If the trust level is less than the transaction risk level, the system may request one or more additional authentication factors (428). Then, the user receives the request for the one or more additional authentication factors (430) and provides the one or more additional authentication factors (432). Next, the system receives the one or more additional authentication factors (434). Moreover, based on the one or more additional authentication factors, the system may update (e.g., increase) the current trust level for the user (436).

In some embodiments of processes 300 (FIG. 3) and 400 there may be additional or fewer operations. Moreover, the order of the operations may be changed, and two or more operations may be combined into a single operation.

We now describe exemplary embodiments of determination of the trust level for the user and the dynamic trust model. Table 1 presents pseudo-code illustrating the determination of the trust level for a given user. In particular, based on their characteristics, each authentication factor may contribute to the trust level. Moreover, the trust level may have an upper bound or maximum value (such as 100). Based on the elapsed time since the user previously provided authentication information, the trust level may be decreased at a rate defined by the trust-level slope. Note that if the trust level is less than the transaction risk level, additional authentication information may be requested.

TABLE 1

```
If authentication information received
    trust level = trust level + authentication characteristic
    (authentication information);
    trust level = minimum(trust level, 100);
    trust time = current time;
else
    trust level = trust level – (current time – trust time) × trust-level slope;
    if trust level < transaction risk level
        trust time = current time;
        request additional authentication information
    end;
repeat
```

Figure 5:
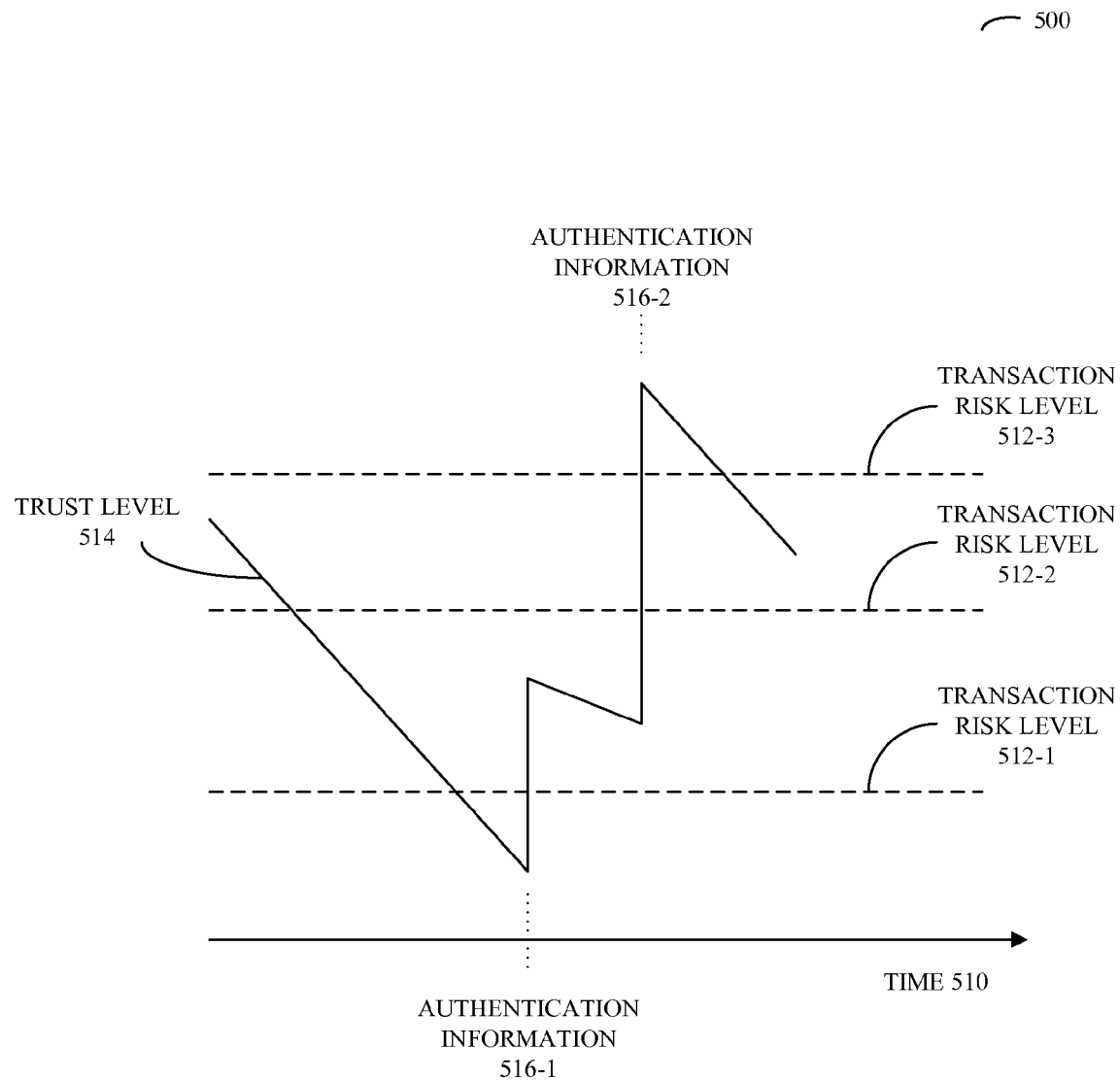
FIG. 5 is a graph illustrating a trust level and transaction risk levels as a function of time.

FIG. 5 presents a graph 500 illustrating a trust level 514 and transaction risk levels 512 as a function of time 510. In this example, trust level 514 decreases, for example, from 100 to 30. Then, additional authentication information 516-1 and 516-2 is provided, increasing trust level 514 to 60 and then to 100. Next, trust level 514 decreases again. Note that the magnitude of the rate of decrease between the providing of authentication information 516-1 and 516-2 is different than at other times.

Depending on the type of user transaction, an overall security threat to a computer system, and/or a user-account history, the transaction risk level may be changed, for example, from transaction risk level 512-1 to transaction risk level 512-3. When trust level 514 is less than the transaction risk level, additional authentication information is requested, such as when authentication information 516-1 and 516-2 is provided.

In an exemplary embodiment, at time equal to 0 a user accesses an account-status web page, which has a risk value of 10. Because there is no valid session, a computer system may request: a username, a password, and an physical token from the user. When the user provides this authentication information, the user may select a mobile profile. This may set the trust-level slope to 1 and may increase the trust level to 100. In addition, the trust time may be set to 0.

At time equal to 30, the user may attempt to access an account-history web page, which has a risk value of 50. The trust level at this time is 100−(30−0)×1 or 70. Because the trust level (70) is greater than the risk level (10), the user may be allowed to access the account-history web page. Additionally, the trust time may be set to 30.

At time equal to 70, the user may attempt to access the account-history web page again, which has a risk value of 50. At this time, the trust level is 70−(70−30)×1 or 30. Because the trust level of 30 is less than the transaction risk level of 50, the computer system requests additional authentication information from the user. In this case, the user answers a personal question as opposed to using a physical token, so the trust level is increased from 30 to 60. Moreover, the trust time is set to 70. Note that, because the trust level is now greater than the transaction risk level, the user is allowed to access the account-history web page.

Subsequently, at time equal to 75, the user attempts to perform a wire transfer, which has a risk value of 90. At this time, the trust level is 60−(75−70)×1 or 55. Because the trust level of 55 is less than the transaction risk level of 90, the user is prompted again for additional authentication information. The user may choose to authenticate by answering two personal questions, which is the limit remaining on this type of authentication information. This increases the trust level to 100, which is greater than the transaction risk level, so the user is allowed to perform the wire transfer. Note that the trust time is set to 75.

At time 80, the user attempts to perform another wire transfer, which has a risk value of 90. At this time, the trust level is 100−(80−75)×1 or 95. Because the trust level of 95 is greater than the transaction risk level of 90, the user is allowed to perform this wire transfer. Note that the trust time is set to 80.

At time 160, the user walks away from the computer and, using his computer, a stranger attempts to access the account-history web page, which has a risk value of 50. At this time, the trust level is 100−(160−80)×1 or 20. Because the trust level of 20 is less than the transaction risk level of 90, the stranger is prompted for additional authentication information, which the stranger cannot provide. However, note that if the stranger had attempted to access the account-summary web page, with a risk value of 10, they would have been able to because the trust level of 20 would have exceeded the transaction risk level.

In the preceding example, the trust-level slope was one. However, if the user selected a profile corresponding to a kiosk instead of a mobile device, then the trust-level slope would have been much larger and the trust level would have decreased much more rapidly as a function of time. In this case, additional authentication would have been requested more often. Additionally, the trust level may have dropped below zero before the stranger had access to the computer, which would have terminated the current session.

Figure 6:
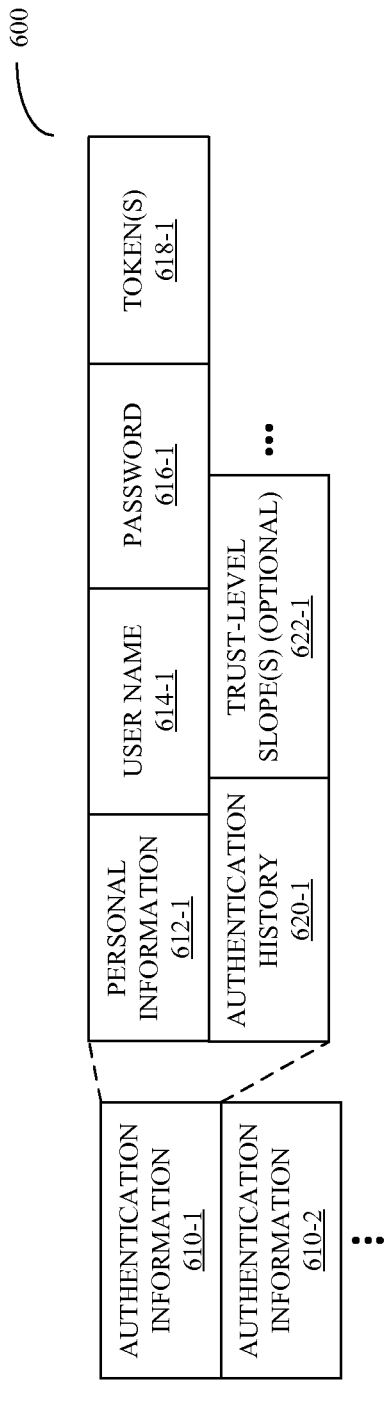
FIG. 6 is a block diagram illustrating a data structure in accordance with an embodiment of the present invention.

We now discuss data structures that may be used in the computer system 100 (FIG. 1) and/or 200 (FIG. 2). FIG. 6 presents a block diagram illustrating a data structure 600. This data structure may include authentication information 610 for one or more users of the financial program. For example, authentication information 610-1 for a user may include: personal information 612-1 (such as an account profile), one or more user identifiers (such as a username 614-1 and/or a password 616-1), information about one or more physical tokens (such as token 618-1), an authentication history 620-1 of the user (including time stamps when the user provided authentication information), and/or one or more optional trust-level slopes 622-1 (which may indicate one or more rates at which the trust level decreases).

Note that the user may have more than one set of authentication information 610 (such as when the user has more than one account and/or more than one account profile). Similarly, a given account may be associated with more than one user.

Moreover, the authentication history 620-1 may be used to determine the trust level for the user (for example, based on the time stamp(s) when the user provided authentication information). Additionally, the time stamp(s) may be used to select when different authentication information is used. For example, if the authentication information includes a series of questions that the user knows the answers to, a given question may not be reused or repeated in rapid succession based on repeated calls within a short time interval.

Figure 7:
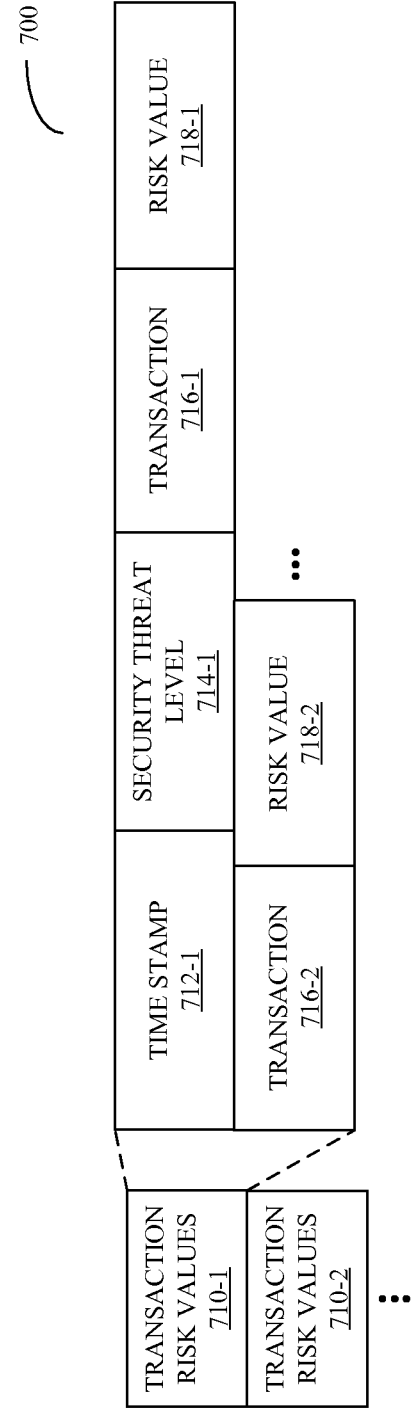
FIG. 7 is a block diagram illustrating a data structure in accordance with an embodiment of the present invention.

FIG. 7 presents a block diagram illustrating a data structure 700. This data structure may include transaction risk values 710 for one or more users of the financial program. For example, transaction risk values 710-1 may include: a time stamp 712-1 (which indicates when this information was used or is valid), a security threat level 714-1 of the computer system, and pairs of types of transactions (such as transaction 716-1) and associated risk values (such as risk value 718-1), which may be used to dynamically calculate the transaction risk level for a given user. In this way, different types of transactions (such as displaying a page of information) may have different associated risk values.

Note that that in some embodiments of the data structures 600 (FIG. 6) and/or 700 there may be fewer or additional components. Moreover, two or more components may be combined into a single component, and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for authenticating a user, comprising:
    determining, by computer, a trust level for the user after a first elapsed time, wherein the trust level is a function of the first elapsed time since the user previously provided authentication information, wherein the trust level decays as a function of the first elapsed time, and wherein a higher trust level is associated with a slower rate of decay of the trust level;
    receiving notice of an identified security threat that affects multiple users;
        determining a new rate of decay of the trust level based on the identified security threat;
        determining a new trust level after a second elapsed time since receiving notice of the identified security threat, wherein the new trust level is obtained by multiplying the second elapsed time with the new rate of decay of the trust level;
        calculating a transaction risk level based on a type of user transaction performed by the user; and
        requesting additional authentication information from the user when the transaction risk level exceeds the new trust level.

2. The method of claim 1, wherein, prior to receiving notice regarding the security threat, a rate of decay of the trust level is based on characteristics of the authentication information the user previously provided.

3. The method of claim 2, wherein a magnitude of the rate of decay is greater than a pre-determined value if the authentication information includes a user identifier.

4. The method of claim 3, wherein the user identifier includes a password and/or a username.

5. The method of claim 2, wherein a magnitude of the rate of decay is smaller than a pre-determined value if the authentication information includes a physical token.

6. The method of claim 1, wherein, prior to receiving notice regarding the security threat, a rate of decay of the trust level is based on a user location.

7. The method of claim 6, wherein the user location is determined based on a network address.

8. The method of claim 6, wherein a magnitude of the rate of decay is increased if the user location is different than during a previous user transaction.

9. The method of claim 1, wherein the security threat includes an attempted 'phishing' attack on account information associated with at least one of the multiple users.

10. The method of claim 1, wherein the trust level is increased when the user provides the additional authentication information.

11. The method of claim 10, wherein the increase in the trust level is less than a pre-determined value if the authentication information includes a user identifier.

12. The method of claim 11, wherein the user identifier includes a password and/or a username.

13. The method of claim 10, wherein the increase in the trust level is greater than a pre-determined value if the authentication information includes a physical token.

14. The method of claim 1, further comprising terminating a user session if the trust level is less than a pre-determined threshold.

15. The method of claim 1, wherein the transaction risk level is based on a user-account history.

16. A non-transitory computer-readable storage medium storing instructions that, when executed by a computer, cause the computer to perform a method for authenticating and authorizing a user, the method comprising:
    determining a trust level for a user after a first elapsed time, wherein the trust level is a function of the first elapsed time since the user previously provided authentication information, wherein the trust level decays as a function of the first elapsed time, and wherein a higher trust level is associated with a slower rate of decay of the trust level;
    receiving notice of an identified security threat that affects multiple users; determining a new rate of decay of the trust level based on the identified security threat;
    determining a new trust level after a second elapsed time since receiving notice of the identified security threat, wherein the new trust level is obtained by multiplying the second elapsed time with the new rate of decay of the trust level;
    calculating a transaction risk level based on a type of user transaction performed by the user; and
    requesting additional authentication information from the user when the transactional risk level exceeds the new trust level.

17. The non-transitory computer-readable storage medium of claim 16, wherein the trust level is increased when the user provides the additional authentication information.

18. A computer system, comprising:
    a processor;
    memory; and
    a program module, wherein the program module is stored in the memory and configured to be executed by the processor, the program module including:
        instructions for determining a trust level for a user after a first elapsed time, wherein the trust level is a function of the first elapsed time since the user previously provided authentication information, wherein the trust level decays as a function of the first elapsed time, and wherein a higher trust level is associated with a slower rate of decay of the trust level;

instructions for receiving notice of an identified security threat that affects multiple users;

instructions for determining a new rate of decay of the trust level based on the identified security threat;

instructions for determining a new trust level after a second elapsed time since receiving notice of the identified security threat, wherein the new trust level is obtained by multiplying the second elapsed time with the new rate of decay of the trust level;

instructions for calculating a transaction risk level based on a type of user transaction performed by the user; and instructions for requesting additional authentication information from the user when the transactional risk level exceeds the new trust level.

19. The computer system of claim 18, wherein the trust level is increased when the user provides the additional authentication information.

\* \* \* \* \*